United States Patent [19]

Crossley et al.

[11] Patent Number: 4,924,506
[45] Date of Patent: May 8, 1990

[54] METHOD FOR DIRECTLY MEASURING AREA AND VOLUME USING BINOCULAR STEREO VISION

[75] Inventors: P. Anthony Crossley, Palo Alto; H. Keith Nishihara, Los Altos; Neil D. Hunt, Mountain View, all of Calif.

[73] Assignee: Schlumberger Systems & Services, Inc., Sunnyvale, Calif.

[21] Appl. No.: 117,704

[22] Filed: Nov. 5, 1987

Related U.S. Application Data

[63] Continuation-in-part of Ser. No. 888,535, Jul. 22, 1986.

[51] Int. Cl.⁵ .............................................. G06K 9/52
[52] U.S. Cl. ...................................... 382/28; 356/12; 356/379; 382/42
[58] Field of Search .......................... 382/26, 42, 28; 356/379, 380, 12

[56] References Cited

U.S. PATENT DOCUMENTS

| | | | |
|---|---|---|---|
| 3,513,444 | 5/1970 | Henderson et al. | 356/379 |
| 4,472,786 | 9/1984 | Lawson | 382/22 |
| 4,573,191 | 2/1986 | Kidode et al. | 382/42 |
| 4,654,872 | 3/1987 | Hisano et al. | 356/12 |
| 4,685,071 | 8/1987 | Lee | 358/80 |
| 4,693,607 | 9/1987 | Conway | 356/380 |

*Primary Examiner*—Leo H. Boudreau
*Assistant Examiner*—Joseph Mancuso
*Attorney, Agent, or Firm*—David H. Carroll; Theodore S. Park; Robert C. Colwell

[57] ABSTRACT

A method for directly measuring the area of a topological surface with an arbitrary boundary shape lying in a fixed elevation different from a fixed surrounding surface elevation relies upon binocular stereo vision. Three stereo correlation measurements are made, one over a window entirely within the surface of interest, a second over a window outside the surface of interest and within the surrounding area, and a third over a window fully containing the surface of interest as well as some of the surrounding area. The correlation measured in the third case is the linear sum of the correlation value over each of the first two cases weighted by the proportion of the window that the two surfaces occupy.

20 Claims, 5 Drawing Sheets

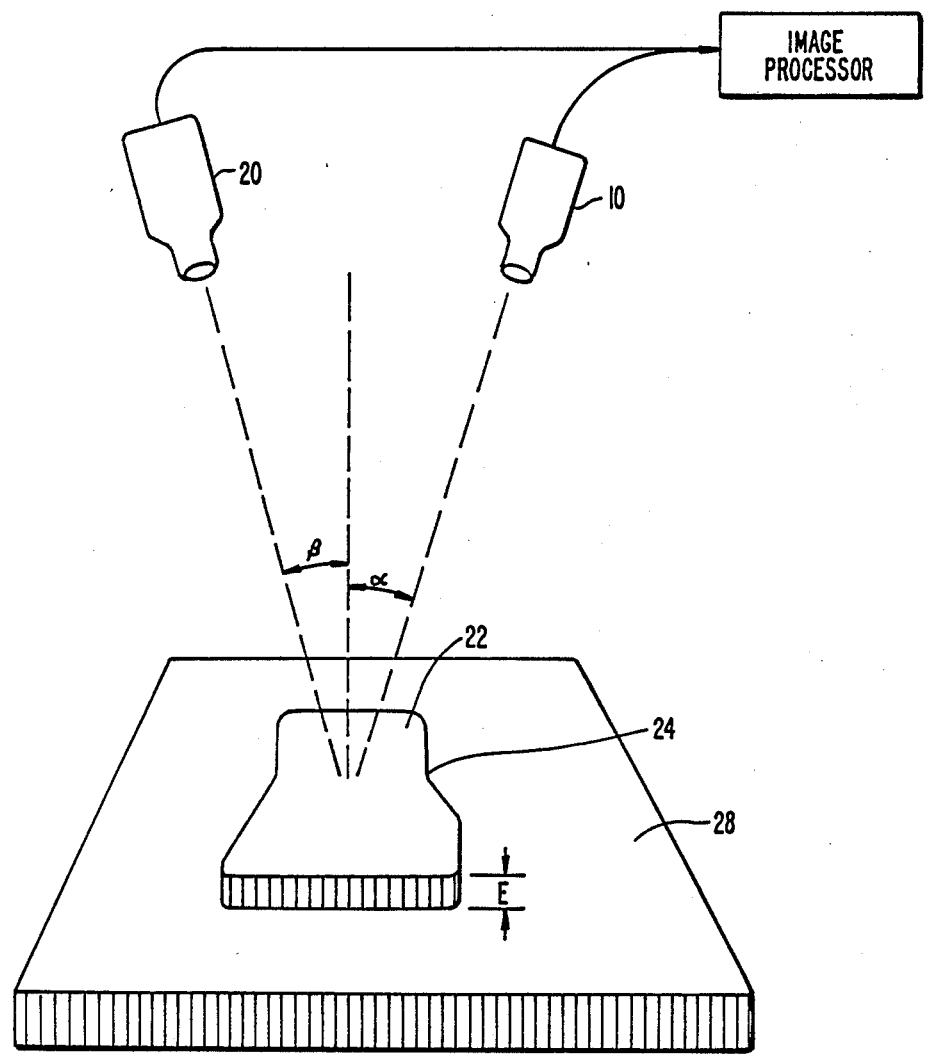
FIG._1.

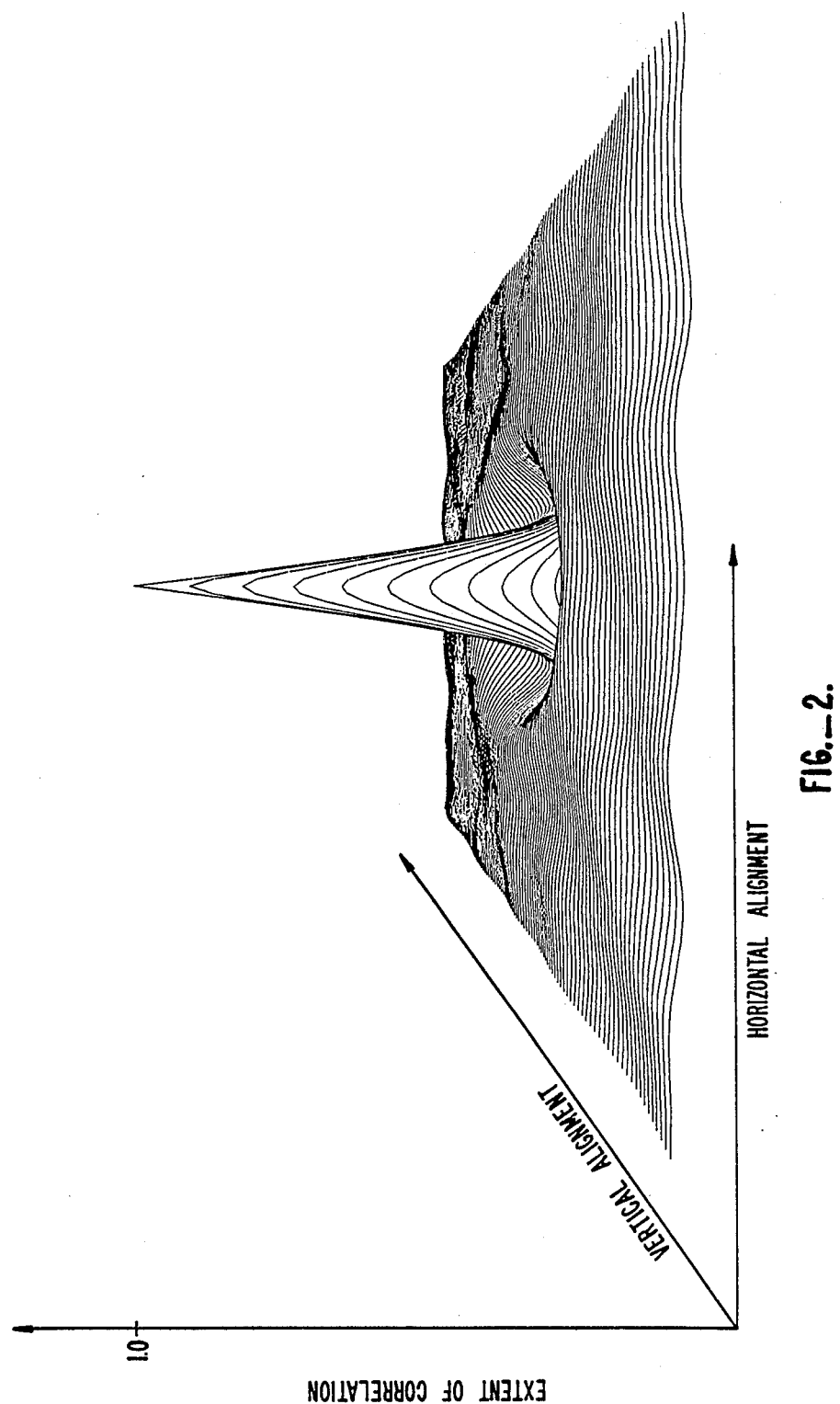
FIG.—2.

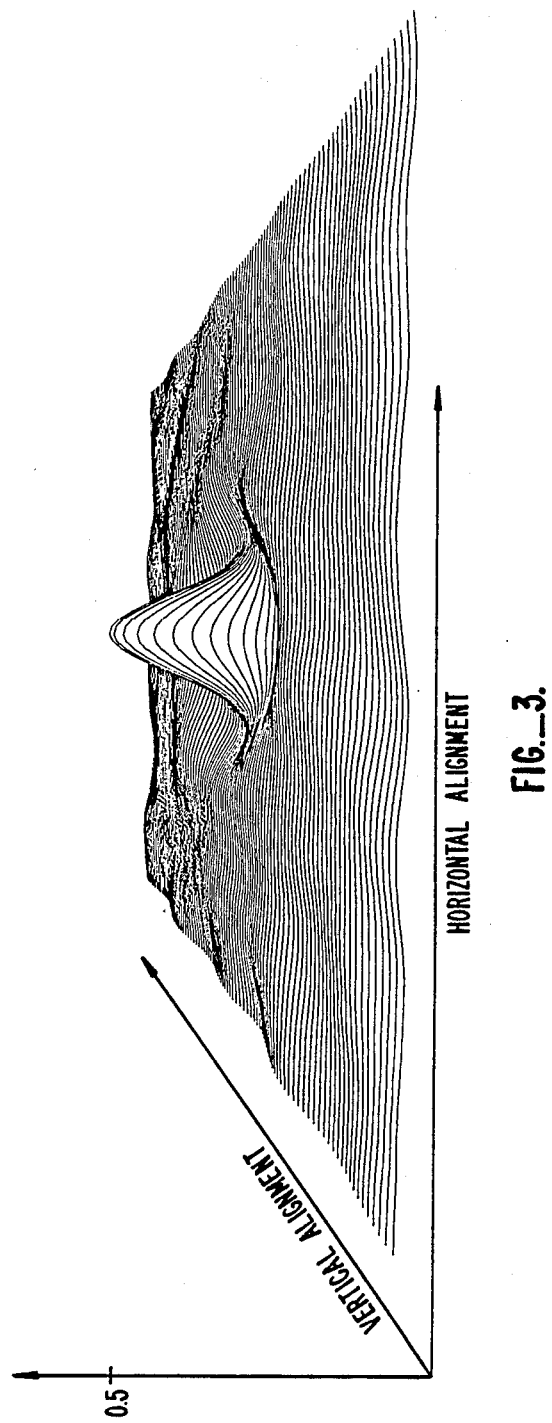

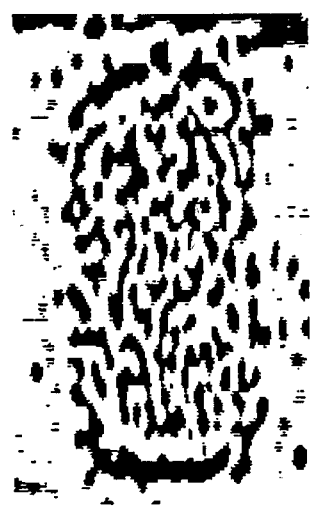
FIG._4a.
FIG._4b.
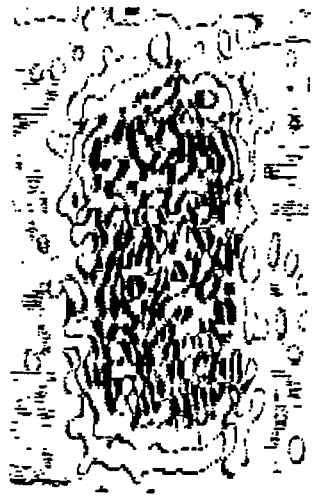
FIG._5a.
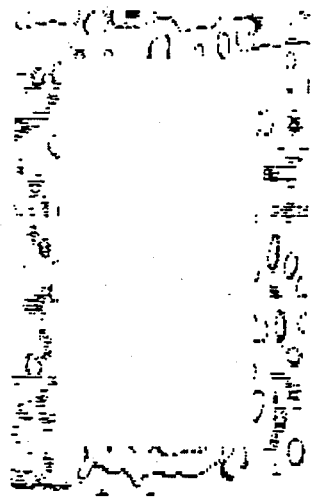
FIG._5b.
FIG._5c.

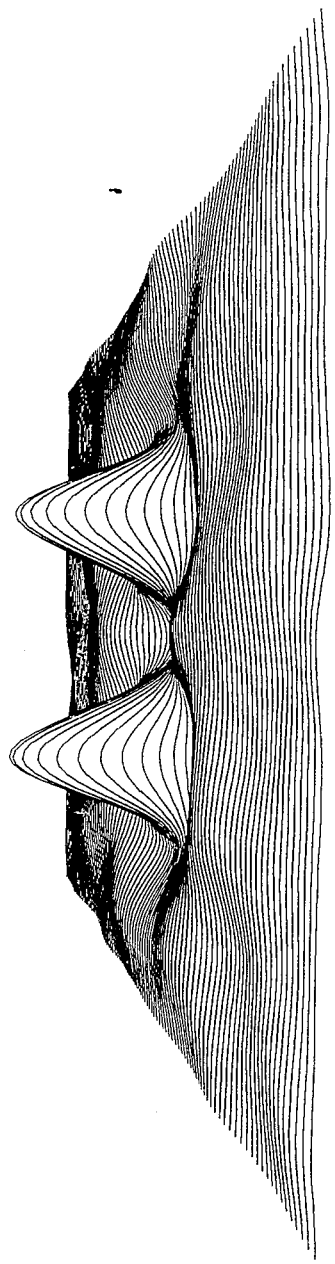
FIG._6.
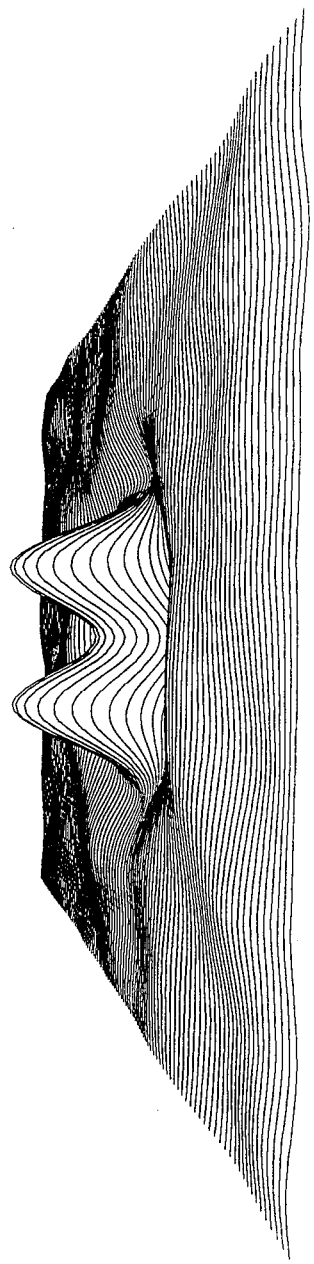
FIG._7.

METHOD FOR DIRECTLY MEASURING AREA AND VOLUME USING BINOCULAR STEREO VISION

CROSS-REFERENCE TO RELATED APPLICATION

This application is a continuation-in-part of U.S. patent application Ser. No. 888,535, filed July 22, 1986, and entitled, "System for Expedited Computation of Laplacian and Gaussian Filters and Correlation of Their Outputs for Image Processing."

BACKGROUND OF THE INVENTION

1. Field of the Invention

This invention relates to methods for measuring areas and volumes, and in particular to a method for measuring the area of a selected region having an arbitrary boundary, the selected region being disposed at a different elevation from a background region having a known area. The invention is particularly applicable to the measurement of area and volume of irregular features resting on a flat plane, such as the volume of a region of solder dispensed onto a printed circuit board during assembly.

2. Description of the Prior Art

Prior art techniques for measuring the area of surfaces typically employed transferring the area of the surface to some other medium from which the area could be determined. For example, the area was transferred to a flat surface upon which a planimeter could be employed, or the area was determined using a computer system by determining the boundary from an image on a screen. The computer could then determine the number of pixels present within the inscribed area.

SUMMARY OF THE INVENTION

We have developed a method for directly measuring the area of a topological surface with an arbitrary boundary shape lying at essentially a fixed elevation different from a fixed surrounding surface elevation. The method employs binocular stereo vision in which images of the area are acquired from each of two separated viewpoints. Three stereo correlation measurements then are performed—one over a window entirely within the arbitrary boundary, one entirely in the background area, and a third which fully contains the surface of interest. The shape of the defining boundary is not explicitly calculated, instead our method makes area correlation measurements between a pair of processed binocular stereo images which are sensitive to area. Our method is applicable to a wide range of industrial inspection problems, as well as remote sensing applications, where it is desired to measure the area, or with the addition of stereo ranging measurements, the volume. One application of our technique is to measure the area or volume of regions of solder paste dispensed onto a printed circuit board during assembly of electronic systems.

In a preferred embodiment, the method of our invention for determining the area of a selected region having an arbitrary boundary, which selected region is disposed at a different elevation from an underlying background region of known area, includes the steps of acquiring an image of all of the selected region which includes some of the background from each of two separated viewpoints; correlating a first portion of one image with a first portion of the other image, where the first portion of each image is disposed entirely within the selected region, to obtain a first correlation value. A second correlation is performed to correlate a second portion of one image with a second portion of the other image, where the second portion of each image is disposed entirely in the background region and not within the arbitrary boundary, to obtain a second correlation value. Finally, a third correlation is performed to correlate an image containing a known area which includes the entirety of the surface of interest as well as the background with a corresponding portion of the other image to provide a third correlation value. Once the correlation values have been obtained, a step is performed to relate the third correlation value to the difference between the first and second correlation values to provide a measure of the area of the selected region with respect to the known area.

BRIEF DESCRIPTION OF THE DRAWINGS

FIG. 1 is a perspective view of the apparatus of the invention as employed to obtain two images of a selected region having an arbitrary boundary;

FIG. 2 illustrates the correlation surface which results from correlating the sign of the Laplacian of Gaussian convolution of noise-free binocular stereo images of a single plane;

FIG. 3 illustrates the correlation surface obtained when noise is added to each of the input images prior to the convolution;

FIGS. 4a and b illustrate the sign patterns obtained from a stereo pair of a solder paste mound on a printed circuit board;

FIG. 5a illustrates the combination of the images of FIG. 4 using an exclusive OR function to show the locations where the images disagree;

FIG. 5b illustrates the exclusive OR combination of the background outside the solder paste;

FIG. 5c illustrates the exclusive OR correlation of a region wholly within the solder paste;

FIG. 6 illustrates the correlation surface for binocular stereo images of two planes; and FIG. 7 illustrates the correlation surface for binocular stereo images of two planes closer together than those shown in FIG. 6.

DETAILED DESCRIPTION OF THE PREFERRED EMBODIMENTS

We have developed a method for measuring the area of a topological surface with an arbitrary boundary shape which surface is positioned at an essentially fixed elevation different from a surrounding surface elevation. Our method employs binocular stereo vision and apparatus as depicted in FIG. 1. As shown, a first camera 10 and a second camera 20 are positioned to view a topological surface 22 having an arbitrary boundary 24. In the preferred embodiment, each of cameras 10 and 20 is positioned so that angles $\alpha$ and $\beta$ are equal; however, the method of this invention may be carried out with angles which are not equal. Surface 22 lies at a substantially fixed elevation E, above a surrounding surface 28, in other words, surface 22 is the top of a "mesa"-shaped region. Although our method will function with surfaces other than mesas, it is most accurate for essentially flat surfaces disposed at a fixed elevation above an underlying plane, specifically volumes with essentially vertical sidewalls.

To measure area in the usual way, it would be necessary for the boundary enclosing the feature to be measured. The present invention is particularly applicable in circumstances in which such detailed knowledge of the feature is not needed, or may not even be attainable. Because the method of our invention goes directly from the image to the area determination without explicitly passing through a detailed boundary description, our technique allows machine vision to be extended to applications in which it is not practical to obtain sufficient data to reliably extract the boundaries.

The data from the cameras 10 and 20 consists of a pair of grey-level images whose fields of view include both the mesa 22 and a portion of the base plane 28. Both the base plane and the mesa are assumed to have texture which can be imaged. The exact type of texture is not important, as long as enough texture is present to enable correlation of the images from the two cameras. Most natural and industrial scenes contain such texture at an adequate contrast level.

In one application of the method of our invention, the surrounding surface 28 comprises a printed circuit board while the topological surface 22 with an arbitrary boundary 24 comprises a mesa-shaped volume of solder paste which has been deposited on the printed circuit board in anticipation of later assembly of electronic components on the printed circuit board. In such an application, is is desirable to verify the proper operation of the process equipment employed for forming the solder regions to assure that the precise amount of solder is deposited for reliable electrical connections.

The images from cameras 10 and 20 are processed using the method and apparatus described in the copending U.S. patent application of one of us entitled, "System for Expedited Computation of Laplacian and Gaussian Filters and Correlation of Their Outputs for Image Processing," Ser. No. 888,535, filed July 22, 1986. That application, incorporated herein by reference, describes in detail the method and apparatus employed for the processing of images from cameras 10 and 20, i.e., the circuitry represented in FIG. 1 by the block "Image Processor." To enable a complete understanding of this invention, the operation of that apparatus is briefly described below.

Once the images are acquired by the cameras 10 and 20, the method of our invention requires that the image from one camera be correlated with the image from the other. It is this correlation which ultimately provides information about the area of surface 22. We have found that the accuracy of the correlation is improved substantially if the images are filtered to enhance their low frequency structure. Although many different types of filters may be employed, in the preferred embodiment a Gaussian convolution operator is used. The Gaussian convolution employed is a two-dimensional Gaussian which functions to low pass filter the image and attenuate high spatial frequencies, while preserving lower spatial frequencies. The size of the Gaussian operator controls the scale at which structure remains in the filtered image.

After application of the Gaussian filter, a Laplacian filter is employed to detect the locations in the image where local maxima in the rate of brightness change occur. These locations correspond closely with the locations where the Laplacian has a zero value. Once this is determined, only the sign of the result is saved. Because the order of application of the Laplacian and Gaussian operators does not effect the result of a filtering operation, either the Laplacian or the Gaussian operator may be applied first. Examples of the above-described filtering process as applied to random patterns are shown in FIGS. 3, 7 and 8 of the above-referenced patent application.

After the images from the cameras have been filtered using either the above-described process, or some other desired process, the filtered images are correlated with each other. FIG. 2 displays the result of correlating the sign of the Laplacian of Gaussian convolution of two noise-free binocular stereo images of a single textured plane. The normalized extent of correlation between 0 and 1 is plotted on the vertical axis with the X and Y disparities forming the other two axes. The surface shown is a right circular cone with a peak value of 1.0. FIG. 2 illustrates that there is a single overlay alignment between two images of a given image of a plane which results in a maximum correlation, while any disparity in alignment from that maximum results in a lower correlation of the two images. As explained in the above-referenced copending patent application, an electronic system may be employed to automatically compare various offsets and rotational alignments of the two digitized filtered images to determine the relative position of the two which results in the highest correlation.

Prior work by one of us has shown that the autocorrelation surface for the sign of a Laplacian of Gaussian filtered image is approximated quite closely by a right circular cone with a width at the base which is approximately the same as the center diameter $\omega$ of the Laplacian of Gaussian convolution. Equations 1 and 2 below describe the convolution operator the resulting autocorrelation function for a white noise image model.

$$\nabla^2 G = \left(1 - \frac{4r^2}{\omega^2}\right) e^{-\frac{4r^2}{\omega^2}} \quad (1)$$

$$R_s(\tau) = \frac{2}{\pi} \sin^{-1}\left(\frac{R_c(\tau)}{R_c(0)}\right) \quad (2)$$

where r is the radius of the operator, $R_c(\tau)$ is the autocorrelation function of the $\Delta^2 G$ (Laplacian of Gaussian) convolution prior to binarization. For a white noise image, it has the form:

$$R_c(\tau) = k\left(1 - \frac{4\tau^2}{\omega^2} + \frac{2\tau^4}{\omega^4}\right) e^{-\frac{2\tau^2}{\omega^2}} \quad (3)$$

where k is a constant.

In most imaging applications, a substantial amount of noise is present between the stereo camera images. This noise lowers the height of the correlation surface yielding a shape more like that shown in FIG. 3. FIG. 3 represents the correlation surface when 33% noise is added to each of the input images prior to application of the convolution operator. This reduces the peak correlation to about 0.5, and as shown, causes it to be more rounded.

We have determined that if the correlation window viewed through the cameras 10 and 20 contains two planes at different elevations, then to a first approximation the correlation measured in that window will be the linear sum of the correlation value over each of the two surfaces weighted by the respective proportions of the window that the two surfaces occupy. Thus, for a given pair of images if the correlation values for each surface 22 and 28 are known, and they are significantly different, then the ratio of areas occupied by the two windows can be determined.

With the method of our invention, the correlations of the two planes are caused to be significantly different by aligning the images so that either the mesa or the background is at maximum correlation. The elevation difference E between the two surfaces assures that the second surface will not be at maximum correlation.

FIGS. 4 and 5 illustrate the application of our method to the measurement of area. FIG. 4 shows the sign patterns obtained from a stereo pair of images of a solder paste mound on a printed circuit board. The images were filtered using the technique described above in which the filter had a center diameter of 8 pixels. Camera resolution was approximately 0.3 mils per pixel in the X direction and 0.25 mils per pixel in the Y direction. The use of these images to determine the area of the arbitrarily shaped surface 22 is discussed below.

First, the two images are registered electronically using the apparatus of the above-referenced patent application to obtain highest correlation in either the background or the mesa. An exclusive OR function is used in FIG. 5a to show the resulting areas of agreement (white) and disagreement (black). Note that the background was chosen for maximum registration. For the particular application in which the area of a solder paste mesa on a PC board is desired, it is desirable to maximize the correlation on the background, because it has less texture than the solder mesa. The more usable texture of the solder provides a low correlation because of the significant misalignment. In FIG. 5a the primarily white surrounding region evidences the approximate agreement of the images in this area, while the large dark regions in the area over the solder paste in the center of FIG. 5a indicate this portion of the images is noticably out of alignment.

The method of our invention employs three stereo correlation measurements over different portions of the image to determine the area of the arbitrarily shaped region. These correlation measurements may be made in any order. The windows to select the portion of the images to be correlated are determined by values entered into look-up tables of the apparatus employed to carry out the method of this invention. These tables will determine the areas excluded from FIG. 5a to produce each of FIGS. 5b and 5c.

One correlation measurement is made over a smaller window entirely within the surface of interest. This correlation measurement is shown in FIG. 5c, and for that pair of images in the alignment shown, the correlation value is −0.11.

The second correlation measurement is made entirely in the surrounding area. This correlation measurement is illustrated in FIG. 5b and shows that the portion of the image for this area is in substantial alignment as reflected by the predominantly white appearance and the high correlation value of 0.81. A third correlation measurement is made over a window which includes the entire surface of interest, and this is depicted in FIG. 5a. The correlation value for the entire image is 0.47.

To a first approximation the correlation measured in the entire window is a linear sum of the correlation measurements over each of the two surfaces weighted by the proportion of the window that the two surfaces occupy. Thus, knowing the correlation of each of the two surfaces (−0.11 and 0.81), then the ratio of the area of the surface of interest to the area of the entire window can be calculated. Knowing the window area thereby enables calculation of the area of interest.

In the case of FIG. 5, the ratio of solder paste area to window area will be (1) the difference of the overall correlation from the background correlation, divided by (2) the difference of the correlation of the solder paste from the background correlation. In the preferred embodiment, these calculations are carried out by the microprocessor shown in FIG. 12 of the above-referenced patent application. For the specific correlation values given above, the ratio of solder paste area to window area is 0.37. Knowing the overall window area enables computation of the area of the solder paste by multiplying the ratio by the window area. For example, if the window area is 0.005 square inch, the solder area is 0.00185 square inch.

The technique of our invention may be extended to enable a determination of the volume of the region encompassed between the topological surface of arbitrary boundary shape and the surrounding surface elevation. This volume may be computed from the area of the arbitrary surface and the elevation E of that surface over (or under) the background. The elevation E is determined using stereo ranging measurements with the sign correlation technique described above.

For an image containing two surfaces at different elevations, the correlation surface will have a pair of peaks, in contrast to the single peaks of FIGS. 2 and 3. A typical correlation surface for an image having two spaced-apart planes is shown in FIG. 6. One peak of the two-peak correlation surface represents optimal alignment of the two images when the upper surface is correctly aligned, while the other peak, spaced apart from the first one, represents optimal alignment of the two images when the lower surface is correctly aligned. Thus, the spacing of the peaks is indicative of the elevation E.

The actual elevation of the foreground with respect to the background may be determined by calibration of the apparatus on a known elevated region. This calibration compensates for the magnification of the optical system and the vergence angle $(\alpha + \beta)$ between the two cameras. The result, expressed in pixels per unit elevation, allows calculation of the elevation from the pixel spacing of the peaks of the correlation surface (see FIG. 6). FIG. 7 shows how the correlation surface changes as the separation between the two planes shrinks. Thus, the correlation surface of FIG. 7 represents a surface with lower elevation than does FIG. 6.

The preceding has been a description of the preferred embodiment of the invention. Although specific details have been provided with respect to the preferred embodiment, these details should be understood as being for the purpose of illustration and not limitation. The scope of the invention may be ascertained from the appended claims.

We claim:

1. A method of determining the area of a selected region having an arbitrary boundary, the selected region disposed at a different elevation than a background region of known area encompassing all of the selected region comprising:

acquiring an image of all of the selected region which image includes some of the the background from each of two separated viewpoints;

in an arbitrary order, correlating a first portion of one image with a first portion of the other image, where the first portion of each image is disposed entirely within the selected region, to obtain a first correlation value;

correlating a second portion of one image with a second portion of the other image, where the second portion is disposed entirely within the background, to obtain a second correlation value;

correlating a third portion of one image with a third portion of the other image, where the third portion includes all of the selected region, to obtain a third correlation value; and then relating the third correlation value to the difference between the first and second correlation values to provide a measure of the area of the selected region with respect to the known area of the background region.

2. A method as in claim 1 wherein following the step of acquiring, a step is performed comprising:
filtering the acquired images to remove some of the higher spatial frequencies.

3. A method as in claim 2 wherein the step of filtering comprises applying a Gaussian convolution operator to the acquired images.

4. A method as in claim 3 wherein the step of filtering further comprises applying a Laplacian operator to the acquired image.

5. A method as in claim 4 wherein the step of filtering further comprises taking the sign of the result of applying the Laplacian operator.

6. A method as in claim 1 wherein prior to any of the steps of correlating a step is performed comprising:
registering the images from the two separated viewpoints to obtain a higher correlation over one of the selected region or the background than over the other.

7. A method as in claim 1 wherein the step of relating the third correlation value comprises:
determining a first difference between the third value and the second value;
determining a second difference between the first value and the second value; and
dividing the first difference by the second difference to provide a ratio of the area of selected region to the area of the third portion of the image.

8. A method as in claim 7 further comprising:
multiplying the ratio by the known area of the third portion to obtain the area of the selected region.

9. A method as in claim 1 wherein the selected region comprises an upper surface of a volume of material, and a correlation surface of the third portion includes two separated peaks of high correlation, the method further comprising:
determining the elevation of the material by determining separation of the two peaks; and
using the area of the selected region and the elevation to determine the volume of the material.

10. A method as in claim 1 wherein the step of acquiring an image comprises:
focusing a pair of cameras on the selected region, one camera at each viewpoint, wherein the viewpoints are disposed at equal angles from a perpendicular to the selected region.

11. A method of determining the area of a selected region having an arbitrary boundary disposed at a fixed elevation above a background region of known area, the method comprising:

acquiring an image of the selected region and the background from each of two separated viewpoints;

filtering each of the images by taking the sign of a Laplacian of Gaussian convolution of each image;

in an arbitrary order, correlating a first portion of one filtered image with a first portion of the other filtered image, where the first portion of each filtered image is disposed entirely within the selected region, to obtain a first correlation value;

correlating a second portion of one filtered image with a second portion of the other filtered image, where the second portion is disposed entirely within the background, to obtain a second correlation value;

correlating a third portion of one filtered image with a third portion of the other filtered image, where the third portion includes all of the selected region, to obtain a third correlation value; and then relating the third correlation value to the difference between the first and second correlation values to thereby provide a measure of the area of the selected region with respect to the known area of the background region.

12. A method as in claim 11 wherein the selected region comprises solder and the background comprises a printed circuit board.

13. A method of determining the volume of a region of material disposed on an underlying surface comprising:

from two viewpoints acquiring an image of all of the region which image also includes some of the surface;

correlating the images acquired from each of the two viewpoints to provide a measure of the area of the region of material and its elevation;

multiplying the area by the elevation to obtain the volume, and wherein the step of correlating the images includes:

in an arbitrary order, correlating a first portion of one image with a first portion of the other image, where the first portion of each image is disposed entirely within the region of material, to obtain a first correlation value;

correlating a second portion of one image with a second portion of the other image, where the second portion is disposed entirely within the underlying surface, to obtain a second correlation value;

correlating a third portion of one image with a third portion of the other image, where the third portion includes all of the region of material, to obtain a third correlation value; and then relating the third correlation value to the difference between the first and second correlation values to provide a measure of the area of the region with respect to the area of the underlying surface.

14. A method as in claim 13 wherein following the step of acquiring, a step is performed comprising:
filtering the acquired images to remove some of the higher spatial frequencies.

15. A method as in claim 14 wherein the step of filtering comprises applying a Gaussian convolution operator to the acquired images.

16. A method as in claim 15 wherein the step of filtering further comprises applying a Laplacian operator to the acquired image.

17. A method as in claim 16 wherein the step of filtering further comprises taking the sign of the result of applying the Laplacian operator.

18. A method as in claim 13 wherein prior to any of the steps of correlating, a step is performed comprising:
registering the images from the two separated viewpoints to obtain a higher correlation over one of the region of material or the underlying surface than over the other.

19. A method as in claim 13 wherein a correlation surface of the region of material includes two separated peaks of high correlation, the step of correlating the images further comprising:
determining the elevation of the material by determining separation of the two peaks.

20. A method as in claim 13 wherein the step of acquiring an image comprises:
focusing a pair of cameras on the region of material, one camera at each viewpoint, wherein the viewpoints are disposed at equal angles from a perpendicular to the selected region.

* * * * *